United States Patent
Chen

(10) Patent No.: US 8,789,864 B2
(45) Date of Patent: Jul. 29, 2014

(54) SPRING BOX FOR DOOR HANDLE

(76) Inventor: Te-Yu Chen, Pingtung (TW)

(*) Notice: Subject to any disclaimer, the term of this patent is extended or adjusted under 35 U.S.C. 154(b) by 161 days.

(21) Appl. No.: 13/397,689

(22) Filed: Feb. 16, 2012

(65) Prior Publication Data

US 2013/0214465 A1  Aug. 22, 2013

(51) Int. Cl.
*E05B 3/00* (2006.01)
*E05B 15/02* (2006.01)

(52) U.S. Cl.
USPC ........ 292/336.3; 292/347; 292/356; 292/357; 292/348; 292/DIG. 53; 292/DIG. 61; 70/224; 70/451; 70/452

(58) Field of Classification Search
USPC ........... 292/347, 336.3, 336.5, 348, 353–358, 292/DIG. 52, DIG. 53, DIG. 54, DIG. 61, 292/DIG. 64; 70/224, 452, 451; 267/150
See application file for complete search history.

(56) References Cited

U.S. PATENT DOCUMENTS

| | | | | |
|---|---|---|---|---|
| 3,075,796 A * | 1/1963 | Russell et al. | ............. | 292/336.3 |
| 4,998,760 A * | 3/1991 | Nixon et al. | ................. | 292/347 |
| 5,265,924 A * | 11/1993 | Kim | ............................ | 292/336.3 |
| 5,335,950 A * | 8/1994 | Mirshafiee et al. | ........... | 292/356 |
| 5,481,890 A * | 1/1996 | Millman | ......................... | 70/224 |
| 5,529,354 A * | 6/1996 | Studt et al. | ................. | 292/336.3 |
| 5,564,296 A * | 10/1996 | Theriault et al. | ................ | 70/224 |
| 5,727,406 A * | 3/1998 | Banducci | ........................ | 70/224 |
| 5,732,578 A * | 3/1998 | Kang | ............................. | 70/224 |
| 6,038,894 A * | 3/2000 | Hu | ................................. | 70/224 |
| 6,386,602 B1 * | 5/2002 | Lan | ............................. | 292/336.3 |
| 7,137,657 B2 * | 11/2006 | Wu et al. | ....................... | 292/357 |
| 7,828,349 B2 * | 11/2010 | Chen | ............................ | 292/347 |
| 8,047,586 B2 * | 11/2011 | Pilotelli | ........................ | 292/357 |
| 2004/0160068 A1 * | 8/2004 | Dalsing | ...................... | 292/336.3 |
| 2013/0069290 A1 * | 3/2013 | Chen | ............................. | 267/150 |

* cited by examiner

*Primary Examiner* — Carlos Lugo
*Assistant Examiner* — Alyson M Merlino
(74) *Attorney, Agent, or Firm* — Leong C. Lei

(57) ABSTRACT

The spring box contains a base piece, a front plate, a back plate, a rotational piece, and a torsion spring. The base piece and the front and back plates have aligned through holes. A radial gap is configured on the rim of the base piece. The rotational piece has a curved sliding element along a section of the circumference. The sliding element has a groove, a weight block configured at one end of the sliding element, and a notch at the other end. The rotation piece is placed in the through hole of the base piece. The two ends of the torsion spring are embedded in the gap and the notch. The rotational and base pieces are sandwiched between the front and back plates. Then, by the weight of the weight block and the resilience of the torsion spring, a door handle is restored to its default position after being turned.

2 Claims, 4 Drawing Sheets

SPRING BOX FOR DOOR HANDLE

(a) TECHNICAL FIELD OF THE INVENTION

The present invention is generally related to door handles, and more particular to a spring box for restoring a door handle to its default position after being turned clockwise or counterclockwise.

(b) DESCRIPTION OF THE PRIOR ART

Conventionally, a door handle is integrated with some resilient mechanism so that, after the door handle is turned, the door handle is restored to its original position. The resilient means is usually specifically designed for a particular door handle and cannot be used interchangeably between different door handles. Furthermore, conventional resilient means allows the door handle to turn in a single direction which is rather inconvenient, especially when a user's hand is occupied.

SUMMARY OF THE INVENTION

A major objective of the present invention is to provide a spring box for integration with a door handle so that the door handle can be turned clockwise or counterclockwise and that the door handle is restored to its default position after the door handle is turned.

The spring box contains a base piece, a front plate and a back plate sandwiching the base piece, a rotational piece, and a torsion spring. The base piece and the front and back plates have aligned through holes in the center. A radial gap is configured on the rim of the base piece connecting the through hole. The rotational piece has a curved sliding element along a section of the circumference. The sliding element has a groove, a weight block configured at one end of the sliding element and a notch at the other end. The rotation piece is placed in the through hole of the base piece. The two ends of the torsion spring are embedded in the gap and the notch. The rotational piece and the base piece are then jointly sandwiched between the front and back plates. Then, by the weight of the weight block and the resilience of the torsion spring, a door handle is restored to its default position after being turned.

The base piece and the front and back plates have aligned bolt holes around the trough holes for a number of bolts to lock the spring box assembly.

A pin is configured on the rotation piece adjacent to the weight block. The pin is embedded in a limiting slot on the front or back plate so that, together with a blocking piece of the sliding element, the rotational range of the rotation piece is confined.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
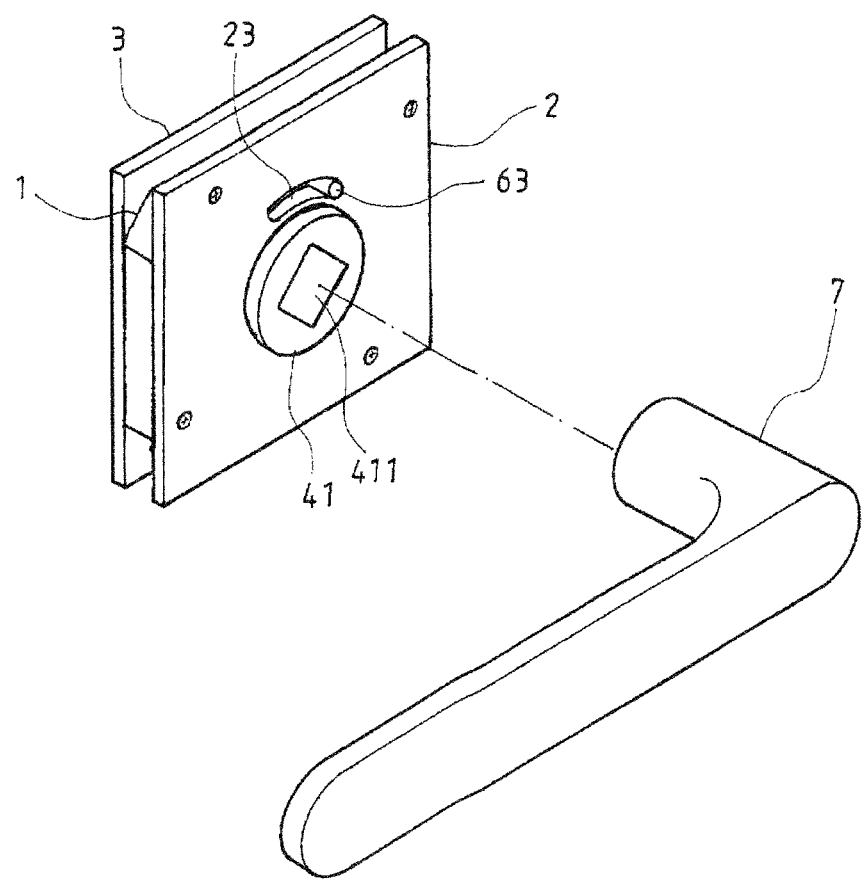
FIG. 1 is a perspective diagram showing a spring box according an embodiment of the present invention.
Figure 2:
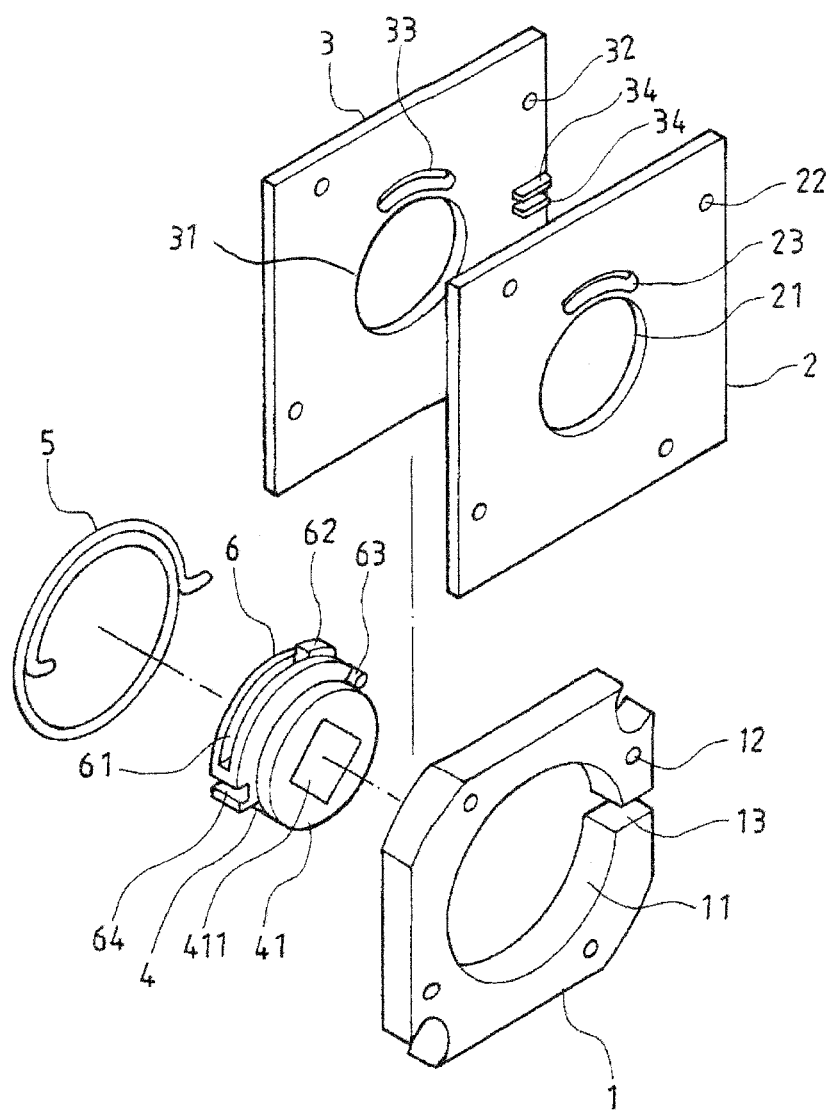
FIG. 2 is a perspective diagram showing the various components of the spring box of FIG. 1.
Figure 3:
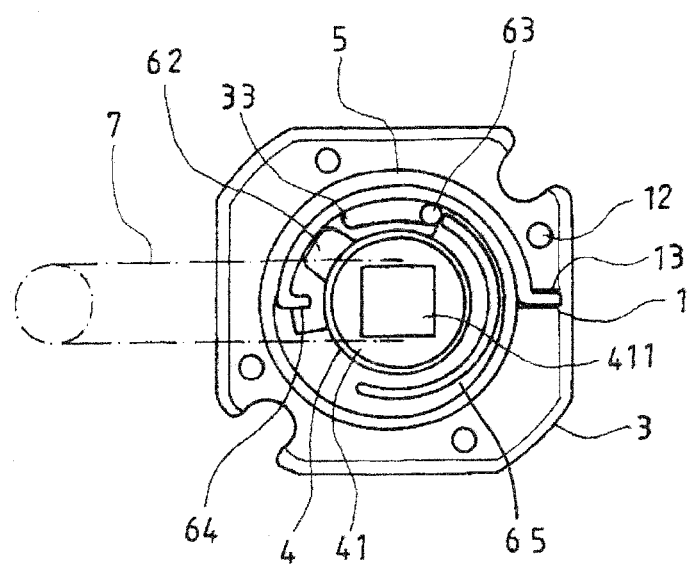
FIG. 3 is a sectional diagram showing the internal of the spring box of FIG. 1 when the door handle is at its default position.

As shown in FIGS. 1 to 3, a spring box according to an embodiment of the present invention contains a base piece 1 sandwiched between a front plate 2 and a back plate 3. Additionally, the spring box contains a rotational piece 4 and a torsion spring 5. The base piece 1 and the front and back plates 2 and 3 has aligned through holes 11, 21, and 31 in the center, and a number of bolt holes 12, 22, and 32 around the through holes 11, 21, and 31, respectively. The base piece 1 has a radial gap 13 on the rim of the base piece 1 connecting the through hole 11 and the outside of the base piece 1. The base piece 1 thereby forms a C-like shape. Also on the front and back plates 2 and 3, there are curved limiting slots 23 and 33 adjacent to an upper section of the through holes 21 and 31, respectively. On an inner side of the back plate 3, there are two parallel flakes 34 protruding towards the front for embedding into the gap 13.

The cylindrical rotational piece 4 has an axle 41 and an indentation 411 at a front end of the axle 41. A curved sliding element 6 is formed along a section of the circumference of the rotation piece 4. The sliding element 6 has a blocking piece 65, and a groove 61 extended from one end of the sliding element 6 to another. A weight block 62 is configured at one end of the sliding element 6 and a notch 64 at the other end. A pin 63 is configured on the sliding element 6 protruding along the axial direction adjacent to the weight block 62.

To assemble the spring box, the rotation piece 4 is placed in the through hole 11 of the base piece 1. The two ends of the torsion spring 5 are embedded in the gap 13 of the base piece 1 and between the flakes 34 in the notch 64 of the sliding element 6. The rotational piece 4 and the base piece 1 are then jointly sandwiched between the front and back plates 2 and 3 with the flakes 34 embedded in the gap 13 and the pin 63 embedded in the limiting slot 23 or 33. Together with the blocking piece 65, the rotation of the rotational piece 4 is limited and confined. Then a number of bolts run through the bolt holes 12, 22, and 32 to complete the assembly. To integrate the spring box with a door handle 7, the axle of the door handle 7 is joined to the indentation 411 of the rotational piece 4. Then, by the weight of the weight block 62 and the resilience of the torsion spring 5, the door handle 7 is restored to its default position after being turned.

Figure 4:
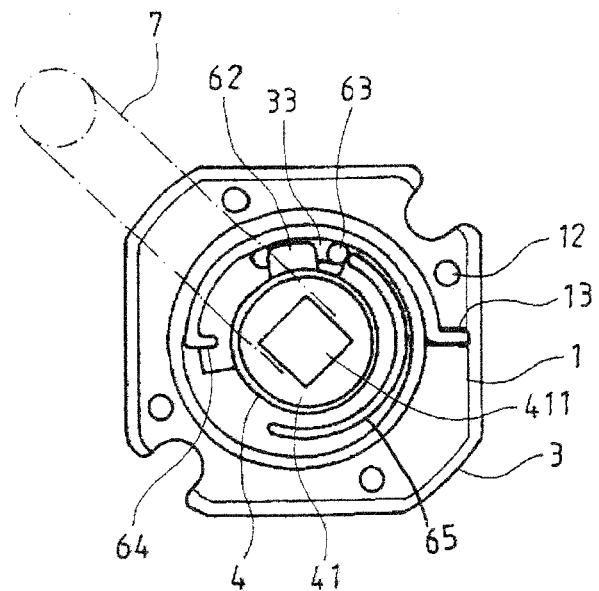
FIG. 4 is a sectional diagram showing the internal of the spring box of FIG. 1 when the door handle is turned clockwise.

FIG. 4 illustrates the configuration of the spring box after the handle 7 is turned clockwise. As illustrated, the rotational piece 4 and the sliding element 6 are turned clockwise as well. When the weight block 62 is at a high location and the door handle 7 is released, the weight of the weight block 62 causes the weight block to move downward and therefore the rotational piece 4 is turned counterclockwise, restoring the door handle 7 to its default position. Please note that the movement of the pin 63 is confined by the limiting slot 23 or 33 and by the blocking piece 65 so as to guarantee the rotational range of the rotational piece 4.

Figure 5:
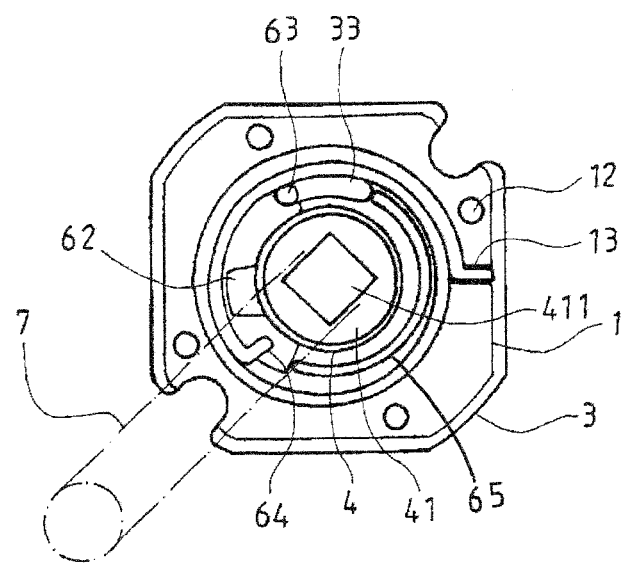
FIG. 5 is a sectional diagram showing the internal of the spring box of FIG. 1 when the door handle is turned counterclockwise.

FIG. 5 illustrates the configuration of the spring box after the handle 7 is turned counterclockwise. As illustrated, the rotational piece 4 and the sliding element 6 are turned counterclockwise as well. In the meantime, the torsion spring 5 is stretched. When door handle 7 is released, the resilience of the torsion spring 5 causes the rotational piece 4 to turn clockwise, restoring the door handle 7 to its default position. Please note that the movement of the pin 63 is confined by the limiting slot 23 or 33 so as to guarantee that rotational range of the rotational piece 4.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A spring box for a door handle, comprising:
   a base piece having a first through hole in the center and a gap at a side connected to said first through hole;
   a front plate having a second through hole in the center aligning with said first through hole and a curved second limiting slot adjacent to and along an upper section of said second through hole;
   a back plate having a third through hole in the center aligning with said first through hole, a curved third limiting slot adjacent to and along an upper section of said third through hole, and two corresponding flakes configured on an inner side of said back plate towards a front direction;
   a rotational piece having an axle with an indentation at a front end and a sliding element on a circumference of said rotational piece, said sliding element having a blocking piece, a groove, a weight block at an end of said sliding element, a notch at another end of said sliding element, and a pin protruding along an axial direction of said rotational piece adjacent to said weight block; and
   a torsion spring having a first end embedded between said two flakes and a second end in said notch; and
   wherein said rotation piece is placed in said first through hole; said rotational piece and said base piece are sandwiched between said front and back plates; said two flakes are embedded in said gap; said pin is embedded in one of said second and third limiting slots so that, together with said blocking piece, the rotation of said rotational piece is limited and confined; and
   wherein said door handle has an axle embedded into said indentation; and, by the weight of said weight block and the resilience of said torsion spring, said door handle is restored to a default position after being turned clockwise or counterclockwise.

2. The spring box according to claim 1, wherein said base piece and said front and back plates have a plurality of aligned bolt holes for bolts to fasten said base piece and said front and back plates together.

\* \* \* \* \*